United States Patent
Maguire (10) Patent No.: US 11,363,464 B2
(45) Date of Patent: Jun. 14, 2022

(54) USAGE DEPENDENT OPTIMIZATION OF RADIO ACCESS NETWORK PARTITION

(71) Applicant: Telefonaktiebolaget LM Ericsson (publ), Stockholm (SE)

(72) Inventor: Patrick Maguire, County Westmeath (IE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 113 days.

(21) Appl. No.: 16/644,089

(22) PCT Filed: Sep. 7, 2017

(86) PCT No.: PCT/EP2017/072515
§ 371 (c)(1),
(2) Date: Mar. 3, 2020

(87) PCT Pub. No.: WO2019/048048
PCT Pub. Date: Mar. 14, 2019

(65) Prior Publication Data
US 2020/0196154 A1  Jun. 18, 2020

(51) Int. Cl.
*H04W 16/02* (2009.01)
*H04W 72/04* (2009.01)

(52) U.S. Cl.
CPC ....... *H04W 16/02* (2013.01); *H04W 72/0486* (2013.01)

(58) Field of Classification Search
CPC ..... H04W 16/02; H04W 16/04; H04W 16/06; H04W 16/10; H04W 72/04; H04W 72/0406; H04W 72/0413; H04W 72/042; H04W 72/0486; H04W 72/0493; H04W 72/08; H04W 72/087
See application file for complete search history.

(56) References Cited

U.S. PATENT DOCUMENTS

| | | | |
|---|---|---|---|
| 2008/0219268 A1* | 9/2008 | Dennison | H04L 45/22 370/395.2 |
| 2016/0352645 A1 | 12/2016 | Senarath et al. | |
| 2017/0086049 A1* | 3/2017 | Vrzic | H04W 40/00 |

(Continued)

OTHER PUBLICATIONS

5G Service—Guaranteed Network Slicing White Paper, Issue v1.0; China Mobile, Huawei, T Deutsche Telekom, Volkswagen—Feb. 28, 2017.

(Continued)

*Primary Examiner* — Kevin D Mew
(74) *Attorney, Agent, or Firm* — Baker Botts, LLP (57) ABSTRACT

A domain manager (320) of a Radio Access Network, RAN, determines a configuration of a RAN resource partition of a network slice. The configuration defines which network elements of the RAN are assigned to the RAN resource partition of the network slice. The domain manager (320) receives at least one report (407, 408, 409) indicating, for at least one of the network elements assigned to the RAN resource partition, an amount of traffic of the network slice handled by the network element in an observation time window. Based on the at least one report (407, 408, 409), the domain manager (320) adapts the configuration of the RAN resource partition by removing one or more of the network elements from the RAN resource partition.

20 Claims, 4 Drawing Sheets

(56) References Cited

U.S. PATENT DOCUMENTS

2017/0135099 A1* 5/2017 Song ............... H04W 76/25
2017/0164349 A1 6/2017 Zhu et al.
2017/0332295 A1* 11/2017 Sunay ............... H04W 36/08
2018/0077024 A1* 3/2018 Zhang ............. H04L 63/0272
2018/0184331 A1* 6/2018 Samdanis ........... H04W 28/16
2020/0314656 A1* 10/2020 Maguire ............ H04W 24/02

OTHER PUBLICATIONS

PCT International Search Report issued for International application No. PCT/EP2017/072515—dated May 9, 2018.

Selection and Dimensioning of Slice-Based RAN Controller for Adaptive Radio Resource Management by Emmanouil Pateromichelakis and Chenghui Peng at Huawei Technologies, German Research Center, Munich Germany —2017 IEEE.

A Deliverable by the NGMN Alliance, NGMN 5G White Paper, Next Generation Mobile Networks; Editor/Submitter: Rachid El Hattachi/Javan Erfanian; Project: NGMN 5G Initiative—Feb. 17, 2015.

PCT Written Opinion of the International Searching Authority for International Application No. PCT/EP2017/072515—dated May 9, 2018.

\* cited by examiner

USAGE DEPENDENT OPTIMIZATION OF
RADIO ACCESS NETWORK PARTITION

PRIORITY

This nonprovisional application is a US. National Stage Filing under 35 U.S.C. § 371 of international Patent Application Serial No. PCT/EP2017/072515 filed Sep. 7, 2017 and entitled "USAGE DEPENDENT OPTIMIZATION OF RADIO ACCESS NETWORK PARTITION" which is hereby incorporated by reference in its entirety.

TECHNICAL FIELD

The present invention relates to methods for managing a network slice in a communications network and to corresponding devices and systems.

BACKGROUND

As the communications networks evolve, also the number of services provided grows. By way of example, the services provided by a communication network have evolved from a simple voice communication at the very beginning to voice and data communication, including texting, email, web browsing, video transmission and others in 4G ($4^{th}$ Generation) wireless networks. A further increase in the number of services can be expected for future 5G ($5^{th}$ Generation) wireless networks. When looking at the wide range of applications and services to be provided by a 5G network, it is quite obvious that these cannot effectively be addressed with a traditional approach of having a purpose-built network for each application. This would lead to high cost for networks and devices as well as inefficient use of valuable frequency resources. An operator may have one physical network infrastructure and one pool of frequency bands, which may support many separate virtualized networks, also called network slices. Each network slice may have unique characteristics for meeting the specific requirements of the use case/s it serves. The key driver for introducing network slicing is business expansion, i.e., improving a network operator's ability to serve other industries, e.g., by offering connectivity services with different network characteristics (performance, security, robustness, and complexity). Network slicing may be applied to a 4G network, e.g., based on the LTE (Long Term Evolution) technology specified by 3GPP, or to a 5G network, e.g., based on the NR (New Radio) technology currently developed by 3GPP.

Network slicing typically involves creating logically separated partitions of the network, which may address different business purposes. These network slices are logically separated to a degree that they can be regarded and managed as networks of their own. Network slices can be associated with different slice tenants, namely entities that provide services to the end user via the network slice. Examples of slice tenants could be:
  armed forces providing, e.g., voice communication via a
    dedicated network slice;
  vehicles manufacturers providing, e.g., vehicle diagnostic
    services via a dedicated network slice.

It is also common to associate a Service Level Agreement (SLA) to each network slice. Such SLA may for example indicate the treatment to which services provided within the network slice should be subjected.

A current working assumption for network slicing is that there will be one shared Radio Access Network (RAN) infrastructure that will connect to several Core Network (CN) instances, such as Evolved Packet Core (EPC) instances (one EPC instance per network slice) or a further EPC evolution.

When using one physical RAN used for multiple network slices, two aspects should be taken into account. The first aspect is that network slicing should make possible to support several different virtual networks on the same physical network infrastructure in order to reduce costs and energy consumption compared to deploying separate physical networks for the different use cases or business scenarios. In order to fully exploit this benefit, it is required that the slicing concept allows for efficient usage of common resources such as radio resources and infrastructure, and transport links between the slices such as fronthaul and backhaul. The second aspect is that mechanisms are required to protect common channels or resources used for UEs (user equipments) accessing system so that congestion in one slice does not have a negative impact on another slice (often called slice isolation).

In view of slice isolation, it may be necessary to implement resource isolation in RAN, which may be achieved by resource partitioning. Resource partitioning in RAN may involve dividing up the full radio resource allocation into maximum of six RAN resource partitions (the number of RAN resource partitions may be extended to 32 in the future). The operator will be given parameters to control whether the RAN resource partition is based on Public Land Mobile Network (PLMN) or Subscriber Profile Identity (SPID), and then control how much resources each RAN resource partition shall be given. A RAN resource partition may include multiple cells and multiple access nodes, e.g., eNBs of the LTE technology or 5G access nodes.

Management of RAN partitions may be based on an abstract representation of the RAN, including for example coverage areas of cells or access nodes. A corresponding abstract topology representation of the RAN may be created manually and then be stored in a NMS (Network Management System) which is responsible for configuration and instantiation of the network slices.

At instantiation of a network slice, a customer may request a certain radio coverage. The NMS may determine the required radio coverage and identify which network elements (e.g., cells or access nodes) of the abstract RAN topology are needed to meet the customer's coverage requirement. In many cases the resulting radio coverage exceeds the radio coverage requested by the customer. Accordingly, the physical resources of the RAN would be used in a sub-optimal manner. Further, the customer gets excessive radio coverage free of charge, which reduces the likelihood of subsequent customer requests to extend the offered radio coverage area. This may have a negative impact on the operator's future sales revenues.

Accordingly, there is a need for techniques which allow for efficient management of a network slice with respect to a configuration of a RAN resource partition of the network slice.

SUMMARY

According to an embodiment of the invention, a method of managing a network slice in a communications network is provided. According to the method, a domain manager of a RAN of the communications network determines a configuration of a RAN resource partition of the network slice. The configuration defines which network elements of the RAN are assigned to the RAN resource partition of the network slice. The domain manager receives at least one report indicating, for at least one of the network elements assigned to the RAN resource partition, an amount of traffic of the network slice handled by the network element in an observation time window. Based on the at least one report, the domain manager adapts the configuration of the RAN resource partition by removing one or more of the network elements from the RAN resource partition.

According to a further embodiment of the invention, a domain manager for a RAN of a communications network is provided. The domain manager is configured to determine a configuration of a RAN resource partition of the network slice. The configuration defines which network elements of the RAN are assigned to the RAN resource partition of the network slice. Further, the domain manager is configured to receive at least one report indicating, for at least one of the network elements assigned to the RAN resource partition, an amount of traffic of the network slice handled by the network element in an observation time window. Further, the domain manager is configured to adapt the configuration of the RAN resource partition based on the at least one report, by removing one or more of the network elements from the RAN resource partition.

According to a further embodiment of the invention, a device for management of a RAN of a communications network is provided. The device comprises at least one processor and a memory containing instructions executable by said at least one processor. By execution of the instructions the device is operative to determine a configuration of a RAN resource partition of the network slice. The configuration defines which network elements of the RAN are assigned to the RAN resource partition of the network slice. Further, by execution of the instructions the device is operative to receive at least one report indicating, for at least one of the network elements assigned to the RAN resource partition, an amount of traffic of the network slice handled by the network element in an observation time window. Further, by execution of the instructions the device is operative to adapt the configuration of the RAN resource partition based on the at least one report, by removing one or more of the network elements from the RAN resource partition.

According to a further embodiment of the invention, a domain manager for a RAN of a communications network is provided. The domain manager comprises a module for determining a configuration of a RAN resource partition of the network slice. The configuration defines which network elements of the RAN are assigned to the RAN resource partition of the network slice. Further, the domain manager comprises a module for receiving at least one report indicating, for at least one of the network elements assigned to the RAN resource partition, an amount of traffic of the network slice handled by the network element in an observation time window. Further, the domain manager comprises a module for adapting the configuration of the RAN resource partition based on the at least one report, by removing one or more of the network elements from the RAN resource partition.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to management of a network slice in a wireless communication network. Specifically, the embodiments relate to concepts for optimization of a RAN resource partition of the network slice. The wireless communication network may for example be based on a 4G technology, such as the LTE technology specified by 3GPP, or a 5G radio technology, e.g., the NR technology currently developed by 3GPP.

In the illustrated examples, a configuration of a RAN resource partition may be automatically optimized on the basis of reports indicating an amount of network slice traffic handled by network elements, e.g., cells, of the RAN resource partition. Cells or other network elements for which the reports indicate that there was no network slice traffic in a certain observation time window may be removed from the RAN resource partition. In this way, radio coverage of the RAN resource partition may be adjusted to only include those network elements which are actually required, e.g., to meet a customer request. An initial oversize of the RAN resource partition is thus not critical, which in turn facilitates initial configuration of the RAN resource partition.

Figure 1:
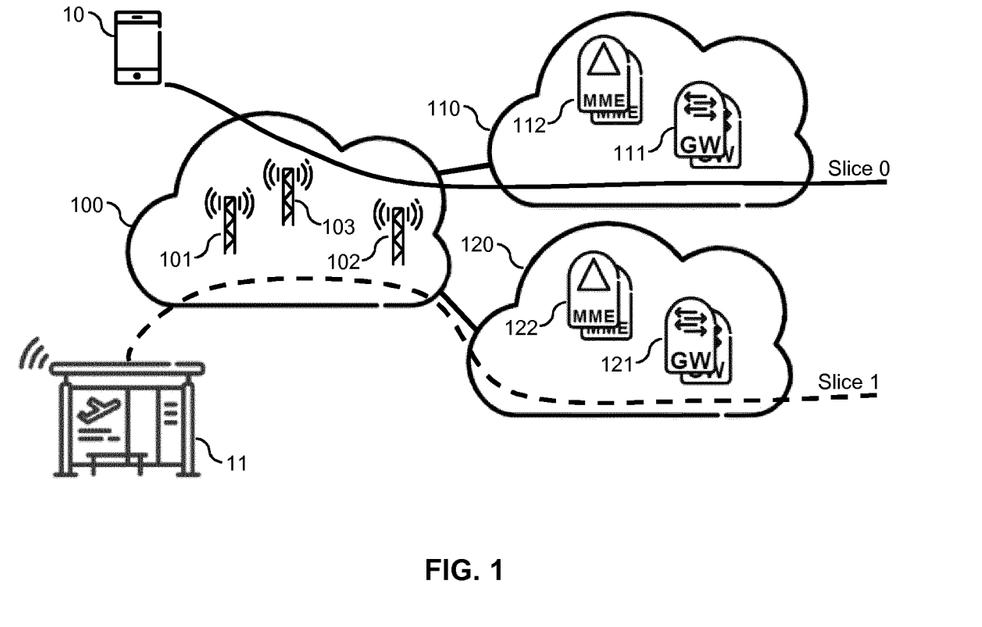
FIG. 1 schematically illustrates network slices according to an embodiment of the invention.

FIG. 1 schematically illustrates network slices as used in the illustrated concepts. More specifically, FIG. 1 illustrates a RAN 100 of the wireless communication network, a first CN instance 110 of the wireless communication network, and a second CN instance 120 of the wireless communication network. As illustrated, the RAN 100 includes multiple network elements 101, 102, 103. These network elements may correspond to cells and/or access nodes serving one or more cells. The first CN instance 110 includes CN nodes 111, 112, and the second CN instance 120 includes CN nodes 121, 122. The CN nodes 111, 112, 121, 122 of the respective CN instance 110, 120 may for example include one or more gateways (GWs) 111, 121, such as an SGW (Serving Gateway) or PGW (Packet Data Gateway) of the EPC. Further, the CN nodes 111, 112, 121, 122 may include one or more mobility management nodes, such as an MME (Mobility Management Entity) of the EPC. However, it is noted that the CN instances could additionally or alternatively also include gateways or mobility management nodes of a 5G technology, e.g., the NR technology.

The first CN instance 110 is assumed to be assigned to a first network slice 110, referred to as "Slice 0". The second CN instance 120 is assumed to be assigned to a second network slice 110, referred to as "Slice 1". Further, FIG. 1 also illustrates an exemplary UE 10 receiving or sending traffic via Slice 0 and an exemplary UE 11 receiving or sending traffic via Slice 0. Accordingly, the example of FIG. 1 assumes that there is a one to one mapping between network slice and CN instance. However, it is noted that the concepts explained herein would also be applicable to scenarios where multiple network slices are supported by the same CN instance. Further, it is noted that the different CN instances 110, 120 do not necessarily need to be implemented by separate physical hardware elements, but could also be implemented on the basis of different virtual CN nodes implemented by the same physical hardware element. For example, a GW 111 of the CN instance 110 and a GW 121 of the CN instance 120 could be implemented as virtual nodes on the same physical hardware element. Similarly, an MME 112 of the CN instance 110 and an MME 122 of the CN instance 120 could be implemented as virtual nodes on the same physical hardware element.

In the example of FIG. 1, the network slices may be used to support different services. For example, Slice 0 could be a Mobile Broadband slice, while Slice 1 could be a Machine Type Communication network slice. However, various other kinds of services could be supported as well. The network slices could also be associated with different tenants, e.g., different customers of an operator of the wireless communication network. Each of these different customers could have an individual SLA with the operator. The SLA could for example specify a radio coverage offered to the customer.

As further illustrated, the RAN 100 of the wireless communication network is shared by both network slices. For this purpose, a corresponding RAN resource partition is configured for each of the network slices. Each of the network elements 101, 102, 103 of the RAN 100 may be assigned to one of the RAN resource partitions, to both RAN resource partitions, or to none of the RAN resource partitions.

Figure 2:
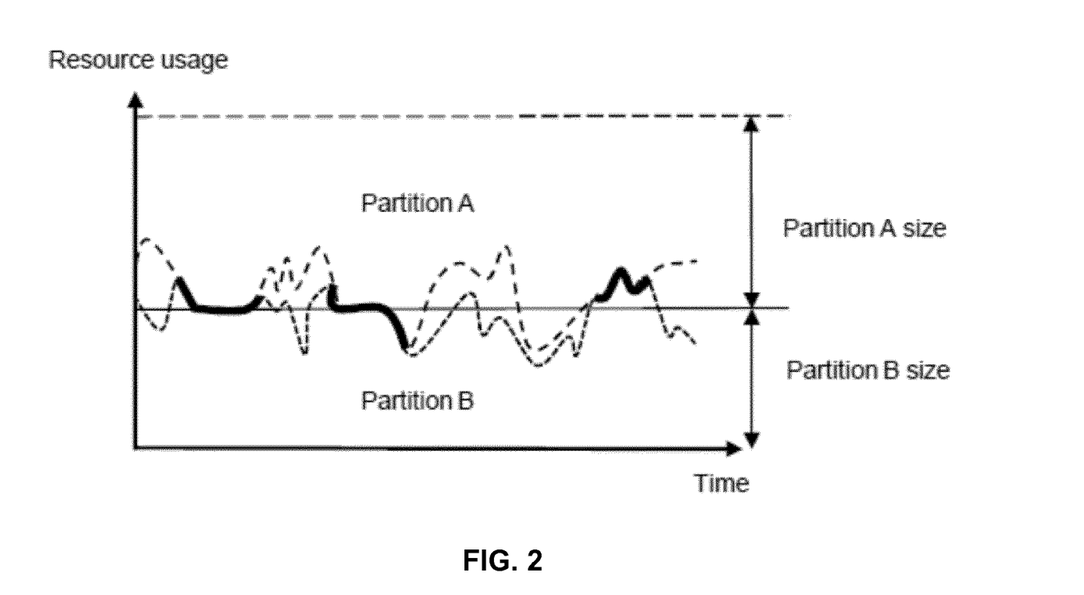
FIG. 2 schematically illustrates effects of RAN resource partitioning as used in an embodiment of the invention.

FIG. 2 illustrates an example of sharing of radio resources by different RAN resource partitions, referred to as "Partition A" and "Partition B". For example, the Partition A could be the RAN resource partition of Slice 0 in the example of FIG. 1, and the Partition A could be the RAN resource partition of Slice 0 in the example of FIG. 1. Under low load, bearers from one of the RAN resource partitions can use resources from the other RAN resource partition, e.g., radio resources or transport capacity. At high load, when the RAN resource partitions are competing for the same resources, the bearers of one RAN resource partition are however bound by a configured partition share size, in FIG. 2 illustrated by a straight vertical line separating the share of Partition A from the share of Partition B. In other words, definition of the RAN resource partitions may also involve ringfencing of resources at high load, which means that the tenant of the RAN resource partition has guaranteed X % of resources, e.g., as specified in a SLA. These X % will be provided when the tenant needs them, but when the tenant needs less than X % of resources the unused portion may be used by other RAN resource partitions. However, if the tenant need its X % in full then the ringfenced resources will be pre-empted so that the tenant can get the guaranteed X %. In FIG. 2 this is illustrated by the thick lines. When partition B needs resources and partition A does not use them then partition B may use them, but no more than is left unused. In case both partitions would need more resources than their allocated share size they are limited to what has been allocated to them. This is shown by the thick line running along the straight vertical line.

Figure 3:
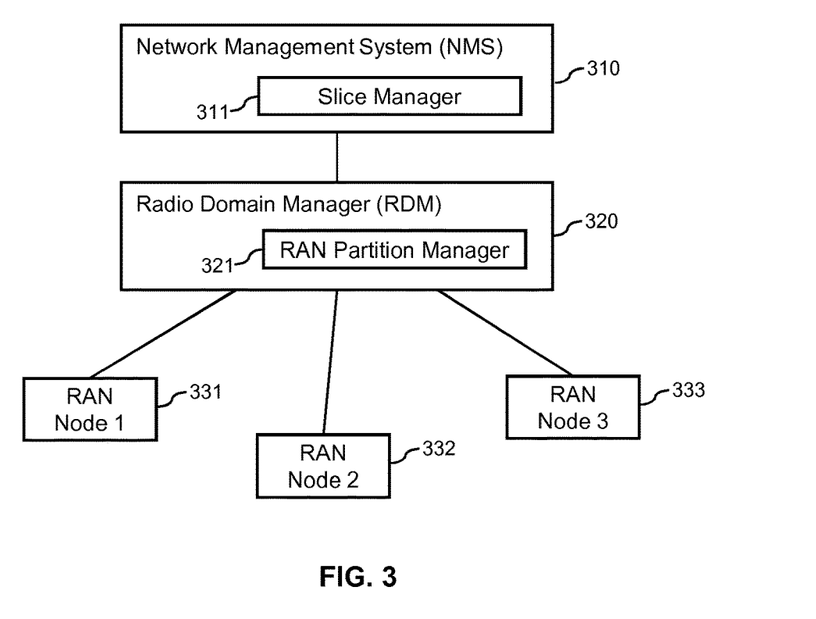
FIG. 3 schematically illustrates a management architecture according to an embodiment of the invention.

FIG. 3 schematically illustrates a management architecture which may be used for implementing the illustrated concepts. As illustrated, the management architecture includes an NMS 310, a Radio Domain Manager (RDM) 320, and multiple RAN nodes 331, 332, 333 controlled by the RDM 320. The RAN nodes 331, 332, 333 may for example include one or more access nodes which each serve one or more cells of the wireless communication network. Further, the RAN nodes 331, 332, 333 may include one or more control nodes, such as a Radio Control Function (RCF) of the NR technology. Each of the RAN nodes 331, 332, 333 may thus control one more cells of the RAN 100. Each of these cells may be assigned to a certain RAN resource partition. The RAN nodes 331, 332, 333 may thus control one or more cells, i.e., network elements, of the RAN resource partition. Further, if one of the RAN nodes 331, 332, 333 controls a cell of the RAN resource partition, also this RAN node 331, 332, 333 constitutes a network element of the RAN resource partition.

For managing the network slices configured in the wireless communication network, the NMS 310 includes a slice manager 311. The slice manager 311 may for example be responsible for network slice lifecycle management. In an initial phase, network slice lifecycle management may for example include preparation of a network slice, configuration of the network slice, instantiation of the network slice, and activation of the network slice. In a subsequent phase, network slice lifecycle management may include supervision of usage of the network slice and related reporting. This supervision and reporting may be used as a basis for reconfiguring the network slice, e.g., by scaling or upgrading. In a final phase, network slice lifecycle management may include deactivation and termination of the network slice.

For managing the RAN resource partitions, the RDM 320 includes a RAN partition manager 321. The RAN partition manager 321 may for example be responsible for RAN resource partition lifecycle management. In an initial phase, RAN resource partition lifecycle management may for example include preparation of a RAN resource partition for a network slice, configuration of the RAN resource partition, instantiation of the RAN resource partition, and activation of the RAN resource partition. In a subsequent phase, RAN resource partition lifecycle management may include supervision of usage of the RAN resource partition and related reporting, e.g., to the NMS 310. As further explained below, this supervision also includes receiving and analyzing reports from the RAN nodes 331, 332, 333. The latter reports may be used for optimization of the configuration of the RAN resource partition. In a final phase, RAN resource partition lifecycle management may include deactivation and termination of the RAN resource partition. In the following, an example of optimization of the RAN resource partition will be explained in more detail with reference to FIG. 4.

Figure 4:
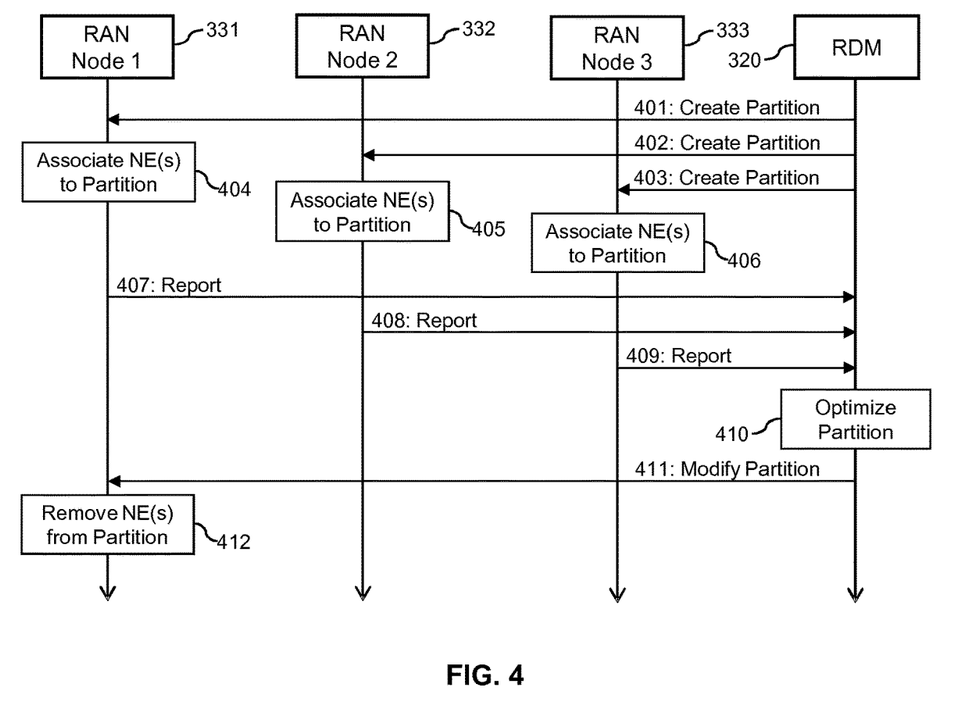
FIG. 4 illustrates an example of processes involving management of a RAN resource partition according to an embodiment of the invention.

The example of FIG. 4 involves the RDM 320 and the RAN nodes 331, 332, 333. Functionalities of the RDM 320 as explained in connection with FIG. 4 may for example be implemented by the RAN partition manager 321.

In an initial phase, the RDM creates the RAN resource partition, e.g., by determining a configuration defining which cells are included in the RAN resource partition. The RAN resource partition is assigned to a certain network slice, e.g., one of the above-mentioned network slices. Creation of the RAN resource partition may be performed automatically, but may also involve manual input from an operator. In the example of FIG. 4, it is assumed that the RAN resource partition includes one or more cells controlled by the RAN node 331, one or more cells controlled by the RAN node 332, and one or more cells controlled by the RAN node 333. By sending management messages 401, 402, 403 to the RAN nodes 331, 332, 333, the RDM 320 instructs the RAN nodes 331, 332, 333 to associate these cells with the RAN resource partition. As illustrated by blocks 404, 405, 406, the RAN nodes each accomplish a corresponding local association of one or more network elements (NEs) with the RAN resource partition. That is to say, the respective RAN node 331, 332, 333 may locally store that the cells indicated by the received management message are assigned to the RAN resource partition and that the RAN node 331, 332, 333 itself is assigned to the RAN resource partition. For this purpose, the RAN resource partition may be defined by a partition name and/or partition identifier. The partition identifier may be unique on the level of the respective RAN node 331, 332, 333, while the partition name may be unique across all RAN nodes 331, 332, 333 controlled by the RDM 320.

Subsequently, the RAN nodes 331, 332, 333 each send one or more reports 407, 408, 409 to the RDM 320. For each cell of the RAN resource partition the reports 407, 408, 409 indicate an amount of traffic of the network slice of the RAN. That is to say, the amount of traffic of the network slice is reported on a cell level. However, it is noted that in some scenarios it is also possible that the reporting is omitted for some of the cells. For example, for some of the cells the configuration of the RAN resource partition could indicate that the cells should be excluded from the optimization, so that reporting is not required for these cells.

The reports may indicate the amount of traffic in terms of one or more counter values. For example, a counter indicating a number of used uplink (UL) physical resource blocks and a counter indicating a number of used downlink (DL) physical resource blocks may be used for this purpose. Accordingly, the reports 407, 408, 409 may distinguish between UL traffic and DL traffic. However, it would also be possible that the reports indicate an overall amount of the traffic, e.g., the sum of UL traffic and DL traffic. The reports may identify the RAN resource partition, e.g., in terms of the partition identifier and/or partition name.

On the basis of the reports, the RDM 320 then optimizes the configuration of the RAN resource partition, as indicated by block 410. Specifically, the RDM decides on the basis of the amount of the traffic reported for a given cell whether to remove the cell from the RAN resource partition. If the amount of traffic in the observation time window is zero or below a threshold, it is likely that the cell is actually not required to provide the required radio coverage, and the RDM 320 removes the cell from the RAN resource partition.

In the example of FIG. 4, it is assumed that the report 407 from the RAN node 331 indicated that the amount of traffic was zero for some of the cells controlled by the RAN node 331, and that the RDM 320 thus decided to remove these cells from the RAN resource partition. In order to effectuate a corresponding adaptation of the configuration of the RAN resource partition, the RDM 320 sends a management message 411 for modifying the RAN resource partition to the RAN node 331. As indicated by block 412, in response to receiving the management message 411, the RAN node 331 locally removes the cells indicated by the management message 411 from the RAN resource partition, i.e., releases the assignment of the removed cells to the RAN resource partition.

In some scenarios, the removal of the cell(s) from the RAN resource partition may also result in removal of all cells controlled by the RAN node 331 from the RAN resource partition. That is to say, after removal of the cell(s) no cells controlled by the RAN node 331 remain in the RAN resource partition. In such a situation, the RDM may also decide to remove the RAN node 331 from the RAN resource partition and indicate this decision in the management message 411. Accordingly, based on the reports 407, 408, 409, the RDM 320 may decide which cell(s) and/or RAN node 331, 332, 333 is to be removed from the RAN resource partition.

Figure 5:
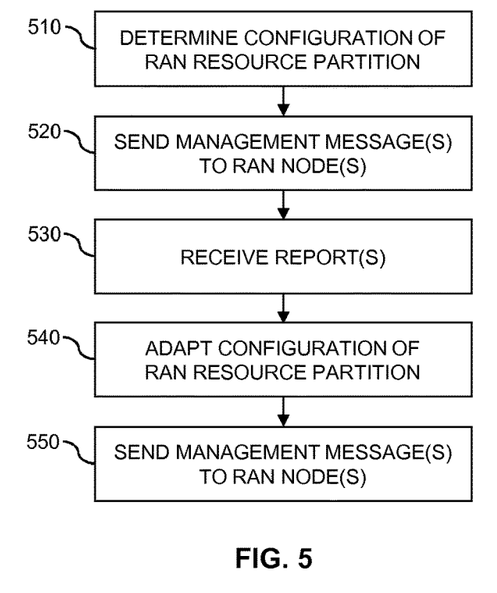
FIG. 5 shows a flowchart for schematically illustrating a method according to an embodiment of the invention.

FIG. 5 shows a flowchart for illustrating a method of managing a network slice in a wireless communication network. The method of FIG. 5 may be utilized for implementing the illustrated concepts in a domain manager of a RAN of a wireless communication network, such as the above-mentioned RDM 320. If a processor-based implementation of the domain manager is used, the steps of the method may be performed and/or controlled by one or more processors of a device implementing the domain manager. Such device may also include a memory storing program code for implementing the below described functionalities or steps of the method.

At step 510, the domain manager determines a configuration of a RAN resource partition of the network slice. The configuration defines which network elements of the RAN are assigned to the RAN resource partition of the network slice. The network elements assigned to the RAN resource partition may include cells, i.e., coverage subareas. In addition, the network elements assigned to the RAN resource partition may include access nodes serving the cells, such as the above mentioned RAN nodes 331, 332, 333. Determining the configuration of a RAN resource partition at step 410 may involve automatically selecting the network elements of the RAN resource partition, e.g., based on a model description of the RAN and a required radio coverage of the RAN resource partition.

At step 520, the domain manager may send one or more management messages to RAN nodes. The management message(s) of step 520 may be used to indicate the determined configuration of the RAN resource partition to the RAN, like explained for the management messages 401, 402, 403 of FIG. 4. However, it is noted that in some scenarios the RAN resource partition could also be otherwise provided to the RAN, e.g., through a manual configuration procedure. In these cases, step 410 may involve that the domain manager is provided with information concerning the existing configuration of the RAN resource partition.

At step 530, the domain manager receives at least one report. Like explained for the reports 407, 408, 409 of FIG. 4, the at least one report may be received from one or more RAN nodes. The at least one report indicates, for at least one of the network elements assigned to the RAN resource partition, an amount of traffic of the network slice handled by the network element in an observation time window. The observation time window may be configurable, for example the domain manager could use the management message sent at step 520 to configure the observation time window. As a general rule, a longer observation time window may be selected in scenarios where the traffic of the network slice is expected to occur only sparsely, e.g., when the network slice is used to provide a service in an event location which is used on a weekly basis. A shorter observation time window may be sufficient if the traffic of the network slice is expected to occur more densely, e.g., when the network slice is used to provide a vehicle diagnostic service in an area of a heavily used road. The at least one report may include an identifier of the RAN resource partition, such as the above-mentioned partition name and/or partition identifier.

At step 540, the domain manager adapts the configuration of the RAN resource partition by removing one or more of the network elements from the RAN resource partition. This is accomplished based on the at least one report received at step 530. The domain manager may remove those network elements for which the at least one report indicates that the amount of the traffic handled by the network element is below a threshold value. The threshold value may be configurable. For example, a low threshold value may be used in scenarios where the traffic of the network slice is expected to occur only sparsely. A higher threshold value may be used if the traffic of the network slice is expected to occur more densely. In some scenarios, the domain manager may remove those network elements for which the at least one report indicates that the amount of the traffic handled by the network element is zero, i.e., which handled no traffic of the network slice. A method which may be used to implement the adaptation is further explained in connection with FIG. 6.

At step 550, the domain manager may send one or more management messages to RAN nodes. The management message(s) of step 550 may be used to indicate the adapted configuration of the RAN resource partition to the RAN, like explained for the management messages 411 of FIG. 4.

Figure 6:
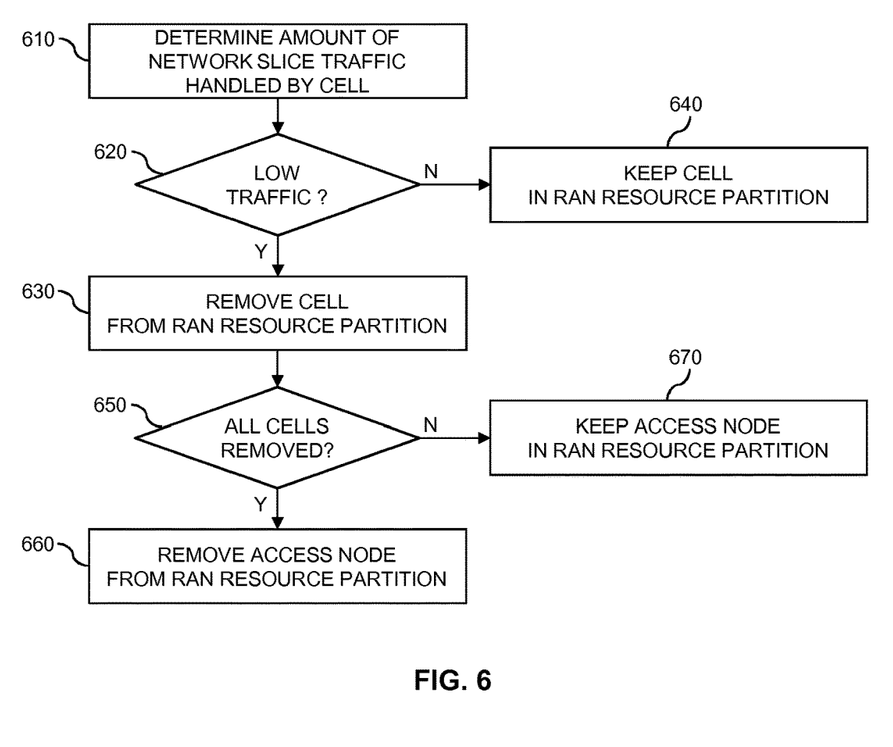
FIG. 6 shows a flowchart for schematically illustrating a method of adapting a RAN resource partition which may be used in the method of FIG. 5.

FIG. 6 shows a flowchart for illustrating a method which may be used to implement the adaptation of the configuration of the RAN resource partition in step 540 of FIG. 5. The method of FIG. 6 may be utilized for implemented by the domain manager. If a processor-based implementation of the domain manager is used, the steps of the method may be performed and/or controlled by one or more processors of a device implementing the domain manager. Such device may also include a memory storing program code for implementing the below described functionalities or steps of the method.

At step 610, the domain manager may use the received report(s) to determine the amount of the traffic of the network slice for one of the network elements, in particular for a cell of the RAN resource partition. The cell is assumed to be served by an access node, e.g., one of the above-mentioned RAN nodes 331, 332, 333.

At step 620, the domain manager determines if the amount of the traffic is low, e.g., zero or below a threshold. A mentioned above, this threshold may be configurable. If the amount of the traffic is found to be low, the method proceeds to step 630 as indicated by branch "Y". Otherwise, the method proceeds to step 640.

At step 630, the domain manager removes the cell from the RAN resource partition. In response to removing the cell from the RAN resource partition, the domain manager may send a management message to the access node serving the cell. This management message may for example be sent at step 550 of FIG. 5. An example of such management message is the above-mentioned management message 411 of FIG. 4. The management message causes the access node to locally release an assignment of the cell to the RAN resource partition. At step 640, the domain manager keeps the cell in the RAN resource partition.

At step 650, the domain manager may check if after removal of the cell at step 640 there are any remaining cells served by the access node in the RAN resource partition, i.e., if all cells served by the access node were removed from the RAN resource partition. If all cells are found to be removed, the method proceeds to step 660 as indicated by branch "Y". Otherwise, the method proceeds to step 670.

At step 660, the domain manager removes the access node from the RAN resource partition. Accordingly, in response to removing all of the cells served by one of the access nodes of the RAN partition, the domain manager may also remove this access node from the RAN resource partition. In response to removing the access node from the RAN resource partition, the domain manager may send a management message to the access node. This management message may for example be sent at step 550 of FIG. 5. An example of such management message is the above-mentioned management message 411 of FIG. 4. The management message causes the access node to locally release an assignment of the access node to the RAN resource partition. At step 670, if there are cells served by the access node remaining in the RAN resource partition, the domain manager keeps the access node in the RAN resource partition.

Figure 7:
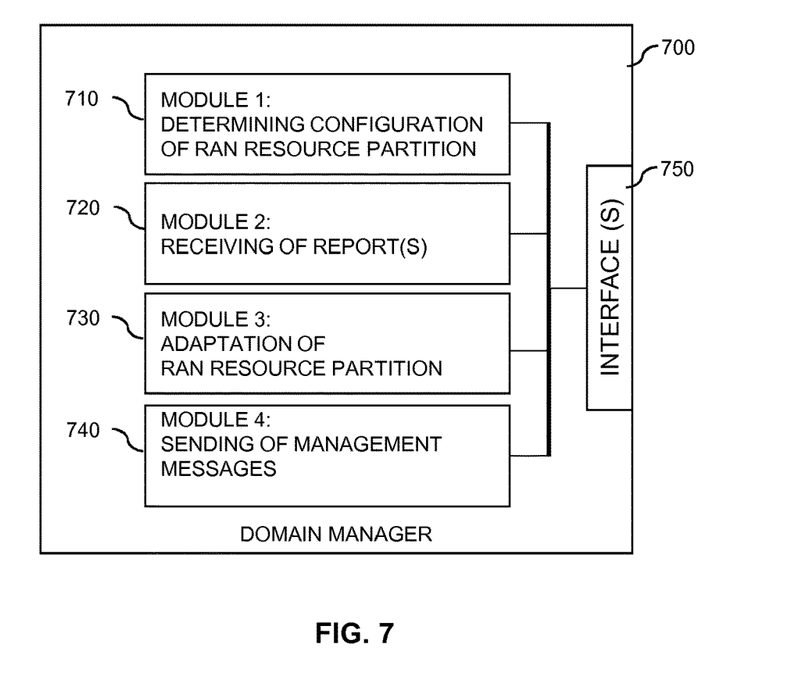
FIG. 7 shows a block diagram for illustrating functionalities of a domain manager according to an embodiment of the invention.

FIG. 7 shows a block diagram for illustrating functionalities of a domain manager 700 which operates according to the method of FIG. 5. As illustrated, the domain manager 700 may be provided with a module 710 configured to determine a configuration of a RAN resource partition, such as explained in connection with step 510 of FIG. 5. Further, the domain manager 700 may be provided with a module 720 configured to receive one or more reports indicating an amount of network slice traffic handled by a network element, such as explained in connection with step 530 of FIG. 5. Further, the domain manager 700 may be provided with a module 730 configured to adapt the configuration of the RAN resource partition, such as explained in connection with step 540 of FIG. 5 and optionally using the method of FIG. 6. Further, the domain manager 700 may be provided with a module 740 configured to transmit one or more management messages, such as explained in connection with step 520 or 550 of FIG. 5.

The domain manager, 700, may also comprise one or more interface, 750, for connecting to the network and via said network to other elements of the network. Although FIG. 7 illustrates one embodiment in which the components of the domain manager, 700, are connected to a bus it would be clear for a person skilled in the art that alternative embodiments are also possible, e.g. connecting the components in series.

It is noted that the domain manager 700 may include further modules for implementing other functionalities, such as known functionalities of a radio domain manager. Further, it is noted that the modules of the domain manager 700 do not necessarily represent a hardware structure of the domain manager 700, but may also correspond to functional elements, e.g., implemented by hardware, software, or a combination thereof.

Figure 8:
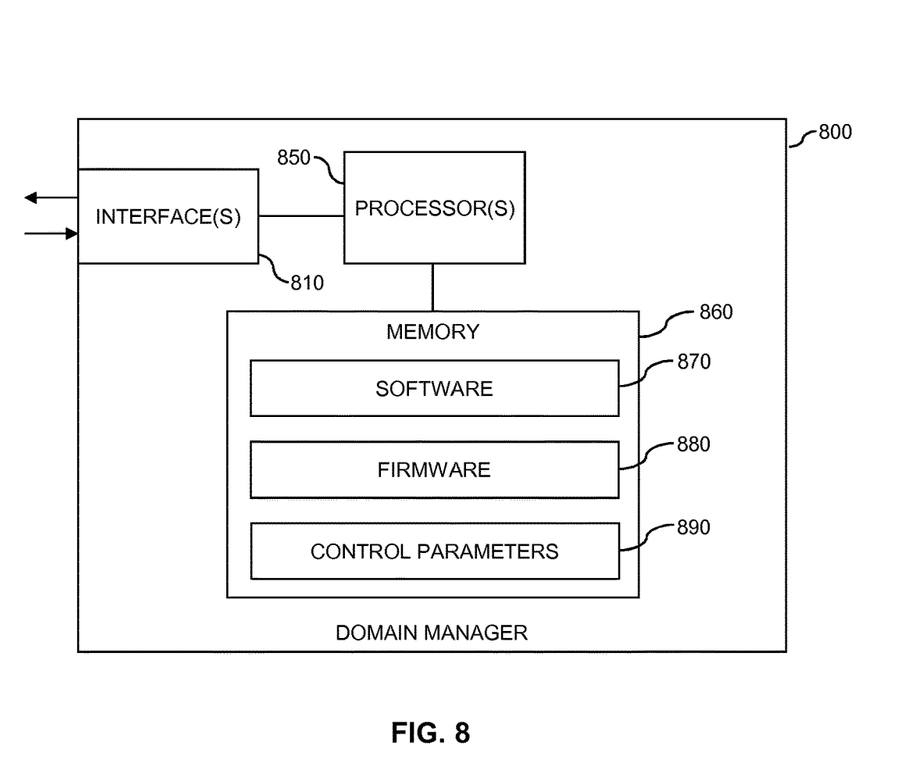
FIG. 8 schematically illustrates structures of a domain manager according to an embodiment of the invention.

FIG. 8 illustrates a processor-based implementation of a domain manager 800 which may be used for implementing the above described concepts. For example, the structures as illustrated in FIG. 8 may be used for implementing the RDM 320 or the domain manager 700.

As illustrated, the domain manager 800 may include one or more interfaces 810 for communicating with RAN nodes or with other nodes of a wireless communication network, e.g., such as the NMS 310. The interface(s) 810 may be used for receiving the above-mentioned reports from the RAN nodes or for sending the above-mentioned management messages to the RAN nodes.

Further, the domain manager 800 may include one or more processors 850 coupled to the interface(s) 810, and a memory 860 coupled to the processor(s) 850. By way of example, the interface(s) 810, the processor(s) 850, and the memory 860 could be coupled by one or more internal bus systems of the domain manager 800. The memory 860 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 860 may include software 870, firmware 880, and/or control parameters 890. The memory 860 may include suitably configured program code to be executed by the processor(s) 850 so as to implement the above-described functionalities of a domain manager, such as explained in connection with FIG. 5 or 6.

It is to be understood that the structures as illustrated in FIG. 8 are merely schematic and that the domain manager 800 may actually include further components which, for the sake of clarity, have not been illustrated, e.g., further interfaces or processors. The components of the domain manager 800 may be connected in series or to a bus, or in some other way. Also, it is to be understood that the memory 860 may include further program code for implementing known functionalities of a radio domain manager. According to some embodiments, also a computer program may be provided for implementing functionalities of the domain manager 800, e.g., in the form of a physical medium storing the program code and/or other data to be stored in the memory 860 or by making the program code available for download or by streaming.

As can be seen, the concepts as described above may be used for efficiently managing a network slice with respect to a configuration of a RAN resource partition of the network slice. In particular, the concepts may allow for obtaining a configuration of the RAN resource partition which is optimized from a radio coverage perspective. This may for example help to achieve improved usage of available radio resources and better throughput for the customer of the network slice and also for other customers. Further, initial configuration of the RAN radio resource partition can be simplified because less care needs to be taken to avoid excessive oversize of the RAN radio resource partition. Further, the optimization of the configuration of the RAN resource partition is beneficial in view of the operator's business perspectives because future expansion requests from a customer are more likely as the radio coverage offered does not excessively exceed the radio coverage requested by the customer.

It is to be understood that the examples and embodiments as explained above are merely illustrative and susceptible to various modifications. For example, the illustrated concepts may be applied in connection with various kinds of wireless communication technologies, without limitation to the above-mentioned examples of the LTE or NR technology. Moreover, it is to be understood that the above concepts may be implemented by using correspondingly designed software to be executed by one or more processors of an existing device, or by using dedicated device hardware. Further, it should be noted that the illustrated nodes or devices may each be implemented as a single device or as a system of multiple interacting devices.

The invention claimed is:

1. A method of managing a network slice in a communications network, the method comprising:
   a domain manager of a Radio Access Network, RAN, of the communications network determining a configuration of a RAN resource partition of the network slice, the configuration defining which network elements of the RAN are assigned to the RAN resource partition of the network slice;
   the domain manager receiving at least one report indicating, for at least one of the network elements assigned to the RAN resource partition, an amount of traffic of the network slice handled by the network element in an observation time window;
   based on the at least one report, the domain manager adapting the configuration of the RAN resource partition by removing one or more of the network elements from the RAN resource partition.

2. The method according to claim 1, wherein the domain manager removes those network elements for which the at least one report indicates that the amount of the traffic handled by the network element is below a threshold value.

3. The method according to claim 2, wherein the threshold value is configurable.

4. The method according to claim 1, wherein the domain manager removes those network elements for which the at least one report indicates that the amount of the traffic handled by the network element is zero.

5. The method according to claim 1, wherein the observation time window is configurable.

6. The method according to claim 1, wherein the at least one report comprises an identifier of the RAN resource partition.

7. The method according to claim 1, wherein the network elements assigned to the RAN resource partition comprise cells and access nodes serving the cells.

8. The method according to claim 7, further comprising:
   in response to removing one of the cells from the RAN resource partition, the domain manager sending a management message to the access node serving the cell, the management message causing the access node to locally release an assignment of the cell to the RAN resource partition.

9. The method according to according to claim 7, further comprising:
   in response to removing all of the cells served by one of the access nodes from the RAN resource partition, the domain manager removing the access node from the RAN resource partition.

10. The method according to claim 9, further comprising:
    in response to removing the access node from the RAN resource partition, the domain manager sending a management message to the access node, the management message causing the access node to locally release an assignment of the access node to the RAN resource partition.

11. A device for management of a radio access network (RAN) of a communications network, the device comprising:
    at least one processor and a memory containing instructions executable by the at least one processor, wherein the device is configured to:
       determine a configuration of a RAN resource partition of the network slice, the configuration defining which network elements of the RAN are assigned to the RAN resource partition of the network slice;
       receive at least one report indicating, for at least one of the network elements assigned to the RAN resource partition, an amount of traffic of the network slice handled by the network element in an observation time window;

based on the at least one report, adapt the configuration of the RAN resource partition by removing one or more of the network elements from the RAN resource partition.

12. The device according to claim 11, wherein the device is further configured to remove the network elements for which the at least one report indicates that the amount of the traffic handled by the network element is below a threshold value.

13. The device according to claim 12, wherein the threshold value is configurable.

14. The device according to claim 11, wherein the device is further configured to remove the network elements for which the at least one report indicates that the amount of the traffic handled by the network element is zero.

15. The device according to claim 11, wherein the observation time window is configurable.

16. The device according to claim 11, wherein the at least one report comprises an identifier of the RAN resource partition.

17. The device according to claim 11, wherein the network elements assigned to the RAN resource partition comprise cells and access nodes serving the cells.

18. The device according to claim 17, wherein the device is further configured to:
   in response to removing one of the cells from the RAN resource partition, send a management message to the access node serving the cell, the management message causing the access node to locally release an assignment of the cell to the RAN resource partition.

19. Domain manager for a radio access network (RAN) of a communications network, the domain manager comprising processing circuitry configured to:
   determine a configuration of a RAN resource partition of the network slice, the configuration defining which network elements of the RAN are assigned to the RAN resource partition of the network slice;
   receive at least one report indicating, for at least one of the network elements assigned to the RAN resource partition, an amount of traffic of the network slice handled by the network element in an observation time window; and
   adapt, based on the at least one report, the configuration of the RAN resource partition by removing one or more of the network elements from the RAN resource partition.

20. A system, comprising:
   a domain manager for a radio access network (RAN) of a communications network; and
   at least one node of the RAN,
   the domain manager being configured to:
      determine a configuration of a RAN resource partition of the network slice, the configuration defining which network elements of the RAN are assigned to the RAN resource partition of the network slice;
      receive at least one report indicating, for at least one of the network elements assigned to the RAN resource partition, an amount of traffic of the network slice handled by the network element in an observation time window;
      based on the at least one report, adapt the configuration of the RAN resource partition by removing one or more of the network elements from the RAN resource partition, and the at least one node of the RAN being configured to send the at least one report.

* * * * *